(12) United States Patent
Poon et al.

(10) Patent No.: US 7,693,342 B2
(45) Date of Patent: Apr. 6, 2010

(54) EVALUATING METHOD OF IMAGE INFORMATION, STORAGE MEDIUM HAVING EVALUATION PROGRAM STORED THEREIN, AND EVALUATING APPARATUS

(75) Inventors: Eunice Poon, Ontario (CA); Megumi Kanda, Tokyo (JP); Ian Clarke, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 1164 days.

(21) Appl. No.: 11/287,270

(22) Filed: Nov. 28, 2005

(65) Prior Publication Data
US 2006/0159364 A1    Jul. 20, 2006

(30) Foreign Application Priority Data
Nov. 29, 2004   (JP) ............................. 2004-344546

(51) Int. Cl.
G06K 9/40    (2006.01)
G03B 17/00   (2006.01)
(52) U.S. Cl. .................... 382/255; 382/275; 348/208.6; 348/231.6; 396/52
(58) Field of Classification Search ................. 382/255, 382/275; 396/52
See application file for complete search history.

(56) References Cited

U.S. PATENT DOCUMENTS

| | | | | |
|---|---|---|---|---|
| 5,949,481 A * | 9/1999 | Sekine et al. | ........... | 348/207.99 |
| 6,081,390 A * | 6/2000 | Konno | ........................ | 359/689 |
| 6,271,883 B1 * | 8/2001 | Iijima et al. | .................. | 348/345 |
| 6,400,902 B1 * | 6/2002 | Usui | ........................... | 396/55 |
| 6,965,397 B1 * | 11/2005 | Honey et al. | ............. | 348/208.2 |
| 6,985,177 B2 * | 1/2006 | Takahashi et al. | ....... | 348/208.99 |
| 7,057,645 B1 * | 6/2006 | Hara et al. | ............... | 348/208.6 |
| 7,079,179 B2 * | 7/2006 | Sumitomo et al. | ........ | 348/222.1 |
| 7,471,886 B2 * | 12/2008 | Hirota et al. | ................... | 396/52 |
| 7,477,291 B2 * | 1/2009 | Seo | ......................... | 348/208.7 |
| 7,542,666 B2 * | 6/2009 | Nakagomi | ................... | 396/54 |
| 7,592,759 B2 * | 9/2009 | Shibatani | .................... | 318/119 |
| 7,606,476 B2 * | 10/2009 | Toji | ............................. | 396/53 |
| 2001/0008418 A1 * | 7/2001 | Yamanaka et al. | .......... | 348/222 |
| 2002/0163581 A1 * | 11/2002 | Kitazawa et al. | ......... | 348/208.6 |
| 2002/0164082 A1 * | 11/2002 | Sumitomo et al. | ......... | 382/254 |
| 2002/0191100 A1 * | 12/2002 | Matsunaga et al. | ......... | 348/345 |
| 2003/0067544 A1 * | 4/2003 | Wada | ...................... | 348/208.7 |
| 2003/0095197 A1 * | 5/2003 | Wheeler et al. | ............. | 348/241 |

(Continued)

FOREIGN PATENT DOCUMENTS

JP    62-127976 A    6/1987

(Continued)

OTHER PUBLICATIONS

Y.Yitzhaky, et al., "Identification of Blur Parameters from Motion Blurred Images", Graphical Models and Image Processing vol. 59, No. 5, September, pp. 310-320, 1997.

*Primary Examiner*—Andrew W Johns
*Assistant Examiner*—Mia M Thomas
(74) *Attorney, Agent, or Firm*—Sughrue Mion, PLLC

(57) ABSTRACT

An evaluating method of image information acquires image information, performs camera shake evaluation of the image information by determining a camera shake direction on the basis of the image information, and performs out-of-focus evaluation of the image information by using information concerning a camera shake direction determined in the camera shake evaluation.

9 Claims, 15 Drawing Sheets

U.S. PATENT DOCUMENTS

| | | | |
|---|---|---|---|
| 2003/0160867 A1* | 8/2003 | Ohto et al. | 348/135 |
| 2004/0080661 A1* | 4/2004 | Afsenius et al. | 348/345 |
| 2004/0175058 A1* | 9/2004 | Jojic et al. | 382/305 |
| 2004/0218813 A1* | 11/2004 | Okada et al. | 382/167 |
| 2004/0239771 A1* | 12/2004 | Habe | 348/208.12 |
| 2005/0047672 A1* | 3/2005 | Ben-Ezra et al. | 382/255 |
| 2005/0225787 A1* | 10/2005 | Yonaha | 358/1.9 |
| 2006/0055787 A1* | 3/2006 | Hirota et al. | 348/208.5 |
| 2006/0078218 A1* | 4/2006 | Igarashi | 382/255 |
| 2008/0309777 A1* | 12/2008 | Aoyama | 348/222.1 |

FOREIGN PATENT DOCUMENTS

| | | |
|---|---|---|
| JP | 6-118468 A | 4/1994 |
| JP | 11-027574 A | 1/1999 |
| JP | 2000-298300 A | 10/2000 |
| JP | 2004-070421 A | 3/2004 |

\* cited by examiner

| -1 | 0 | 1 |
|---|---|---|
| -2 | 0 | 2 |
| -1 | 0 | 1 |

Fig.9A

| -1 | -2 | -1 |
|---|---|---|
| 0 | 0 | 0 |
| 1 | 2 | 1 |

Fig.9B

| P(i-1, j-1)<br>Y(i-1, j-1) | P(i, j-1)<br>Y(i, j-1) | P(i+1, j-1)<br>Y(i+1, j-1) |
|---|---|---|
| P(i-1, j)<br>Y(i-1, j) | P(i, j)<br>Y(i, j) | P(i+1, j)<br>Y(i+1, j) |
| P(i-1, j+1)<br>Y(i-1, j+1) | P(i, j+1)<br>Y(i, j+1) | P(i+1, j+1)<br>Y(i+1, j+1) |

Fig.9C

EVALUATING METHOD OF IMAGE INFORMATION, STORAGE MEDIUM HAVING EVALUATION PROGRAM STORED THEREIN, AND EVALUATING APPARATUS

CROSS-REFERENCES TO RELATED APPLICATIONS

This application relates to and claims priority from Japanese Patent Application No. 2004-344546 filed on Nov. 29, 2004, the entire disclosure of which is incorporated herein by reference.

BACKGROUND OF THE INVENTION

1. Field of the Invention

The present invention relates to evaluating methods of image information, storage media having evaluation programs stored therein, and evaluating apparatuses.

2. Description of the Related Art

When photographing is performed in a camera shake state or an out-of-focus state, an image photographed is blurred. However, it is difficult to determine, looking at the blurred image, whether the blurred image is caused by camera shake or out-of-focus blurring. Thus, various methods of evaluating image information generated by a photographing apparatus such as a digital camera are proposed. For example, a method of evaluating camera shake is proposed (Identification of Blur Parameters from Motion Blurred Image, Y. Yizhaky and N. S. Kopeika, GRAPHICAL MODELS AND IMAGE PROCESSING Vol. 59, No. 5, September, pp. 310-320, 1997).

However, when camera shake evaluation and out-of-focus evaluation are performed, if completely separate kinds of processing are performed, the processing takes time.

SUMMARY

Thus, it is an object of the invention to use a result of camera shake evaluation in out-of-focus evaluation to reduce processing time for evaluation of image information.

A principal invention for attaining the object is characterized by acquiring image information, performing camera shake evaluation of the image information by determining a camera shake direction on the basis of the image information, and performing out-of-focus evaluation of the image information by using information concerning the camera shake direction determined in the camera shake evaluation.

Other characteristics of the invention will be made clear from the descriptions of this specification and attached drawings.

BRIEF DESCRIPTION OF THE DRAWINGS

In the accompanying drawings:

FIG. 9A is a diagram illustrating a Sobel filter in an X direction, FIG. 9B is a diagram illustrating a Sobel filter in a Y direction, and FIG. 9C is a schematic diagram illustrating a range of 3×3 pixels around a certain pixel P (i,j) and a luminance Y of a pixel P in this range;

DESCRIPTION OF EXEMPLARY EMBODIMENTS

Figure 1:
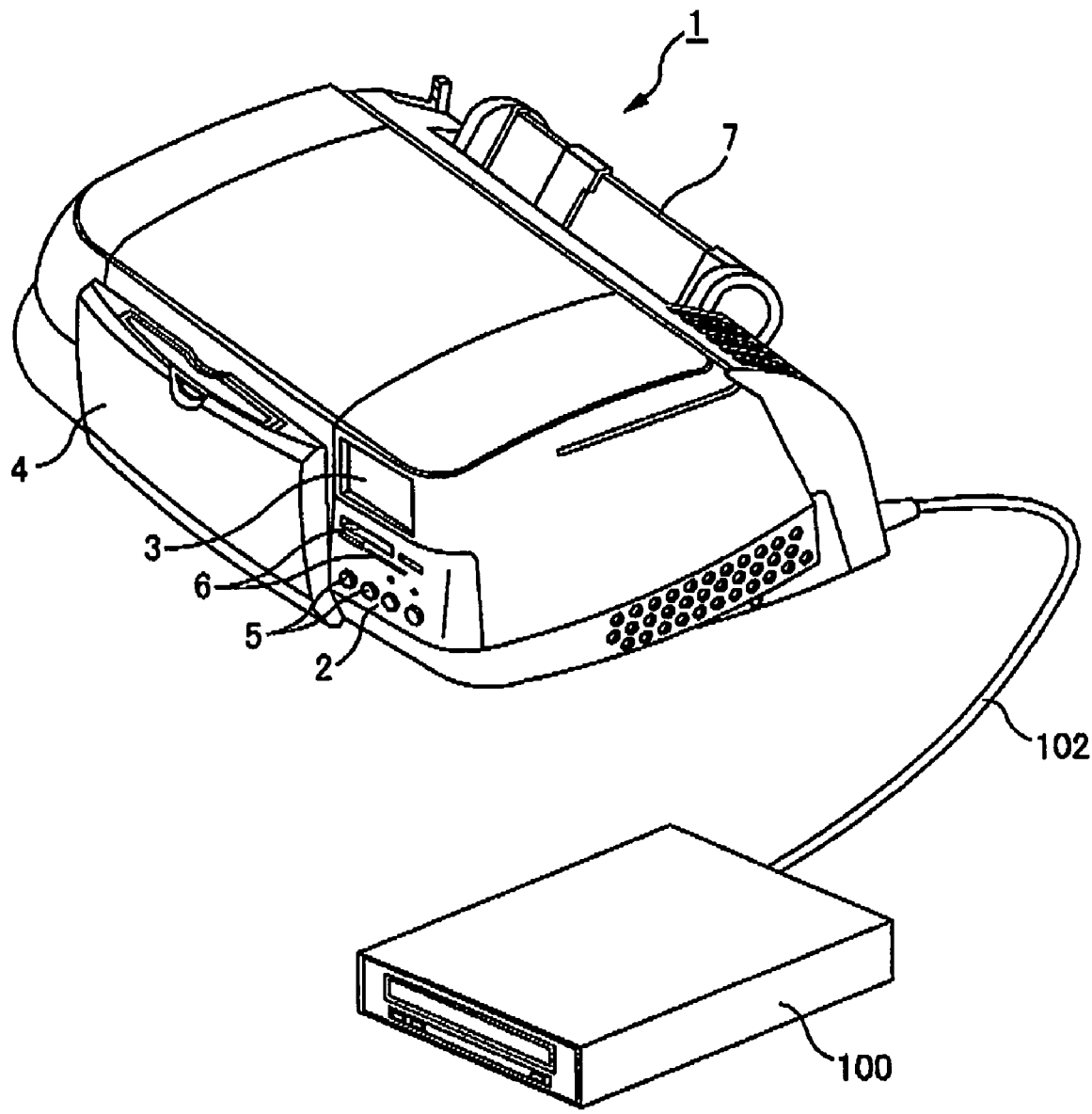
FIG. 1 is a diagram illustrating external appearances of a printer 1 and a CD-R device 100 connected to this printer 1.

At least the following matters are made clear from the description of this specification and the accompanying drawings.

An evaluating method for image information characterized by;

acquiring image information;

performing camera shake evaluation of the image information by determining a camera shake direction on the basis of the image information; and performing out-of-focus evaluation of the image information by using information concerning the camera shake direction determined in the camera shake evaluation.

According to such an evaluating method of image information, it is possible to reduce processing time.

In such an evaluating method, the information concerning the camera shake direction is information on the camera shake direction, and, it is desirable that, in the out-of-focus evaluation, a degree of blurring in a direction perpendicular to the camera shake direction is evaluated. In such an evaluating method, it is desirable that the information concerning the camera shake direction is information on edges of the image information in a direction perpendicular to the camera shake direction. This makes it possible to reduce processing time for the out-of-focus evaluation.

In such an evaluating method, it is desirable that, in the camera shake evaluation, a degree of blurring is evaluated by extracting a sample line in the camera shake direction, and in the out-of-focus evaluation, a degree of blurring is evaluated by extracting a sample line in a direction perpendicular to the camera shake direction. It is preferable that, in the camera shake evaluation and the out-of-focus evaluation, a degree of blurring is evaluated on the basis of an autocorrelation function of the extracted sample lines. It is preferable that, in the camera shake evaluation and the out-of-focus evaluation, the same function is used, in the camera shake evaluation, the camera shake direction is set as an argument, and in the out-of-focus evaluation, the direction perpendicular to the camera shake direction is set as an argument. This makes it possible to perform processing for the out-of-focus evaluation and the camera shake evaluation in common.

In such an evaluating method, it is desirable that, in the camera shake evaluation, a degree of blurring in the camera shake direction is evaluated, and in the out-of-focus evaluation, a degree of blurring in a direction perpendicular to the camera shake direction is evaluated. It is preferable that, in the out-of-focus evaluation, a degree of out-of-focus blurring is evaluated on the basis of a degree of blurring in the camera shake direction and a degree of blurring in the direction perpendicular to the camera shake direction. This makes it possible to perform the out-of-focus evaluation with an influence of camera shake reduced.

In such an evaluating method, it is desirable that the image information is divided into a plurality of areas, a specific area is selected from the divided areas, and the camera shake evaluation and the out-of-focus evaluation are performed to the selected specific area. It is preferable that a luminance difference in the area of each of the divided areas is calculated, and an area in which the luminance difference is the largest is selected as the specific area. This makes it possible to reduce a calculation amount.

In such an evaluating method, it is desirable that camera shake correction is performed to the image information on the basis of a result of the camera shake evaluation, and out-of-focus correction is performed to the image information on the basis of a result of the out-of-focus evaluation. It is preferable that image information subjected to at least one of the camera shake correction and the out-of-focus correction is displayed at no magnification. This allows a user to accurately recognize the image information after correction.

An evaluating program of image information, characterized by causing an arithmetic processing apparatus and a memory to acquire image information;

perform camera shake evaluation of the image information by determining a camera shake direction on the basis of the image information; and perform out-of-focus evaluation of the image information by using information concerning the camera shake direction determined in the camera shake evaluation.

According to such an evaluating program, it is possible to reduce processing time.

An image information evaluating apparatus, characterized by acquiring image information;

performing camera shake evaluation of the image information by determining a camera shake direction on the basis of the image information; and performing out-of-focus evaluation of the image information by using information concerning the camera shake direction determined in the camera shake evaluation.

According to such an image information evaluating apparatus, it is possible to reduce processing time.

Object of Explanation

Concerning Apparatuses to which the Image Evaluating Method is Applied

In the image evaluating method in this embodiment, image information to be evaluated is acquired and evaluation for the acquired image information is performed to obtain evaluation results. It is possible to apply this image evaluating method to various apparatuses.

For example, it is possible to apply this method to a personal computer in which a computer program for image evaluation (e.g., image processing software) is installed. It is also possible to apply this method to various apparatuses that treat image information. Examples of the apparatuses that handle image information include a digital camera, a digital video camera, and a printer.

Thus, in this embodiment, first, a printer that performs image evaluation will be explained. This printer can evaluate image information to be printed stored in a memory card, display evaluation results corresponding to the image information to a user, and store image information selected by the user in a CD-R (recordable compact disc) or the like.

Printer

Concerning a Configuration of the Printer 1

Figure 2:
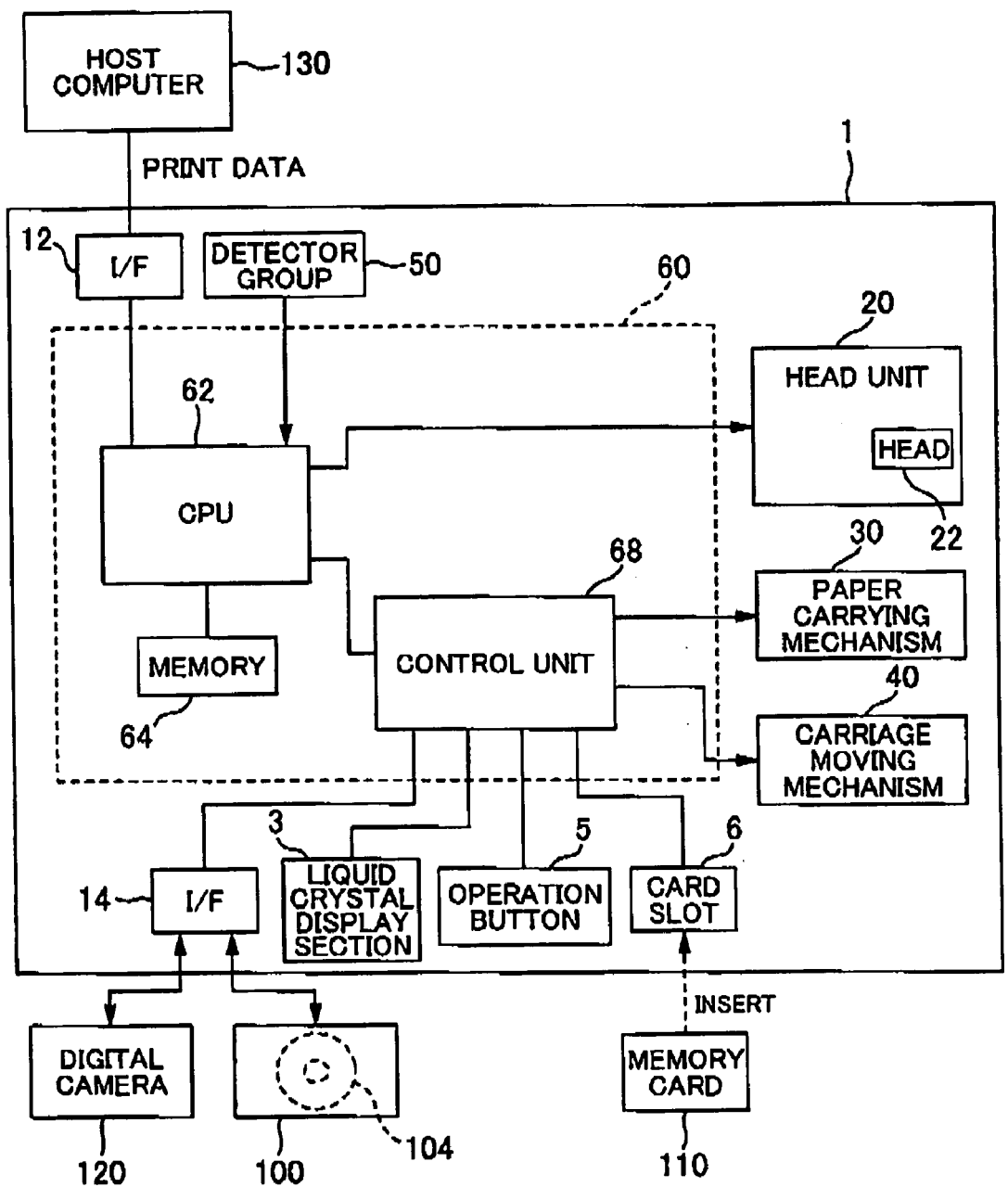
FIG. 2 is a block diagram for explaining an electric constitution of the printer 1.

First, a configuration of the printer 1 will be explained. Here, FIG. 1 is a diagram illustrating external appearances of the printer 1 and the CD-R device 100 connected to this printer 1. FIG. 2 is a block diagram for explaining an electrical constitution of the printer 1.

As shown in FIG. 1, an operation panel 2, a liquid crystal display section 3, and a paper discharging section 4 are provided in a front portion of the printer 1. The various operation buttons 5 and the card slots 6 are provided in the operation panel 2. The operation buttons 5 are operated when an instruction is given to the printer 1. The card slots 6 are sections in which the memory card 110 (a card-type flash memory, see FIG. 2) is inserted. For example, image information of images photographed by the digital camera 120 is stored in this memory card 110. Since there are the several types of memory cards 110, a plurality of the card slots 6 are prepared to make it possible to insert the respective memory cards 110 in the card slots 6. The liquid crystal display section 3 displays various kinds of information. The liquid crystal display section 3 is a section on which a menu is displayed and the images of the image information stored in the memory card 10 are displayed. In this embodiment, the liquid crystal display section 3 is arranged above the operation buttons 5.

An paper discharge tray that can be opened or closed is provided in the paper discharging section 4. The paper discharge tray is attached such that an upper portion thereof can be brought down forward. This paper discharge tray functions as a stand on which a printed sheet is placed at the time of printing. On the other hand, the paper supplying section 7 and various connectors (not shown) are provided in a rear portion of the printer 1. The paper supplying section 7 is a section capable of stacking and holding sheets for printing. The connectors are sections for connecting the printer 1 to external devices such as the CD-R device 100 and the digital camera 120. The connectors are, for example, USB terminals.

In an example in FIG. 1, the CD-R device 100 is connected to the printer 1 via the cable 102. Connection to the printer 1 is not limited to the cable 102 and may be wireless. The CD-R device 100 is used when the image information stored in the memory card 110 is backed up in the CD-R 104. It is also possible to print the image information stored in a CD (compact disc, not shown) and the CD-R 104 by connecting the CD-R device 100 to the printer 1.

An electrical constitution of the printer 1 will be explained. As shown in FIG. 2, the printer 1 includes the head unit 20, the paper carrying mechanism 30, the carriage moving mechanism 40, the detector group 50, the printer side controller 60, the liquid crystal display section 3, the operation button 5, and the card slot 6. Besides, the printer 1 includes a first interface 12 for connecting the printer 1 to the host computer 130 and the second interface 14 for connecting the printer 1 to the digital camera 120 and the CD-R device 100.

The head unit 20 is a unit for ejecting ink to a paper and has the head 22 for ejecting the ink. The head unit 20 is attached to a carriage (not shown) and moves together with the carriage by the carriage moving mechanism 40 that moves the carriage in a carriage movement direction. The paper carrying mechanism 30 carries a paper in a direction crossing the carriage movement direction. The detector group 50 is a detector group for detecting a state of the printer 1. The detector group 50 includes, for example, a linear encoder for detecting a position of the carriage, a rotary encoder for detecting a carried amount of paper, and a paper detector for detecting presence or absence of a paper (all of which are not shown).

The printer side controller 60 is a controller that performs control of the printer 1. The printer side controller 60 includes a CPU 62, a memory 64, and a control unit 68. The CPU 62 is an arithmetic processing device for performing overall control of the printer 1. The memory 64 is a memory for securing an area for storing a program for the CPU 62, a work area, and the like, and is constituted by a storage element such as a RAM, an EEPRCM, or a ROM. Image information to be evaluated is stored in the memory 64 at the time of evaluation of the image information. The control unit 68 is arranged between respective sections to be controlled and the CPU 62. The control unit 68 generates a drive signal for a motor on the basis of a command from the CPU 62 and changes signals sent from the respective sections into a form interpretable by the CPU 62 to output the signals.

Usually, when the printer 1 receives print data from the host computer 130, the printer 1 performs print processing on the basis of the print data. That is, after the reception of the print data, the printer side controller 60 causes the paper carrying mechanism 30 to carry a sheet to a print start position, causes the carriage moving mechanism to move the carriage in the carriage movement direction, and ejects the ink from the head moving with the carriage on the basis of the print data. When these operations are repeated, an image is printed on the sheet.

Moreover, the printer 1 in this embodiment performs backup processing of image information. In the backup processing, the printer side controller 60 causes the CD-R device 100 to store the image information in the CD-R from the memory card 110 inserted in the card slot 6. This back up processing is started when a user operates the operation button 5. Note that, in this embodiment, evaluation of image information is also performed in this backup processing. The backup processing and the evaluation processing for image information will be hereinafter explained.

Evaluation and Backup of Image Information

Concerning an Outline of the Backup Processing

Figure 3:
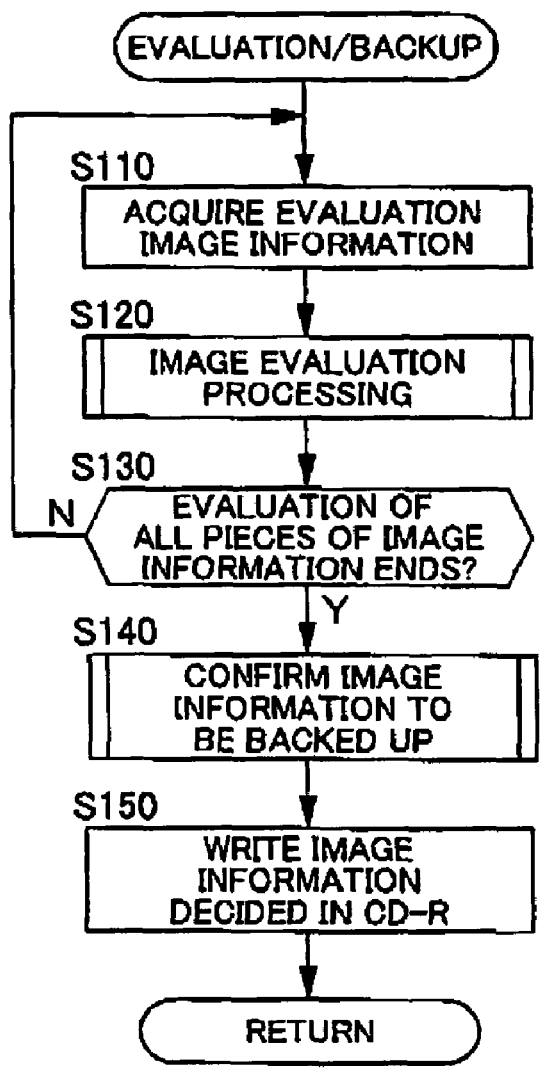
FIG. 3 is a flowchart explaining backup processing.

FIG. 3 is a flowchart explaining the backup processing. This processing is executed by the CPU 62 on the basis of a program stored in the memory 64 of the printer 1. Therefore, the program has codes for causing the CPU 62 to execute the processing.

In this processing, first, the CPU 62 performs acquisition of evaluation image information (S110). Here, the evaluation image information refers to image information to be evaluated. In this processing, the CPU 62 decides one piece of evaluation image information out of the image information to be backed up, which is stored in the memory card 110, and stores this evaluation image information in the memory 64. Therefore, when there are a plurality of pieces of image information to be backed up, the CPU 62 acquires one of the plurality of pieces of image information as the evaluation image information. Further, when there is one piece of image information to be backed up, the CPU 62 acquires the image information as the evaluation image information.

Subsequently, the CPU 62 performs the image evaluation processing (S120). In this image evaluation processing, the CPU 62 applies the camera shake evaluation and the out-of-focus evaluation to the evaluation image information. Note that, this image evaluation processing will be explained later.

Subsequently, the CPU 62 judges whether or not all the pieces of the image information are evaluated (S130). When there is unevaluated image information, the CPU 62 returns to step S110 and performs the processing described above. On the other hand, when evaluation for all the pieces of image information ends, the CPU 62 performs processing for confirming the image information to be backed up (S140). In this processing, the CPU 62 asks the user to confirm, on the basis of evaluation results in the image evaluation processing (S120), whether image information not meeting a criteria is to be backed up. In this case, a screen for facilitating the user's confirmation is displayed on the liquid crystal display section 3, and the image information to be backed up is decided according to an input from the operation button. When the image information to be backed up is decided, the CPU 62 writes the decided image information in the CD-R 104 (S150). In this writing processing, the CPU 62 causes the CD-R 104 to store the evaluation results (contents of evaluation) obtained in step 5120 together with the image information to be evaluated. For example, the evaluation results are stored as additional information in an Exif (exchangeable image file format).

Image Evaluation Processing

Figure 4:
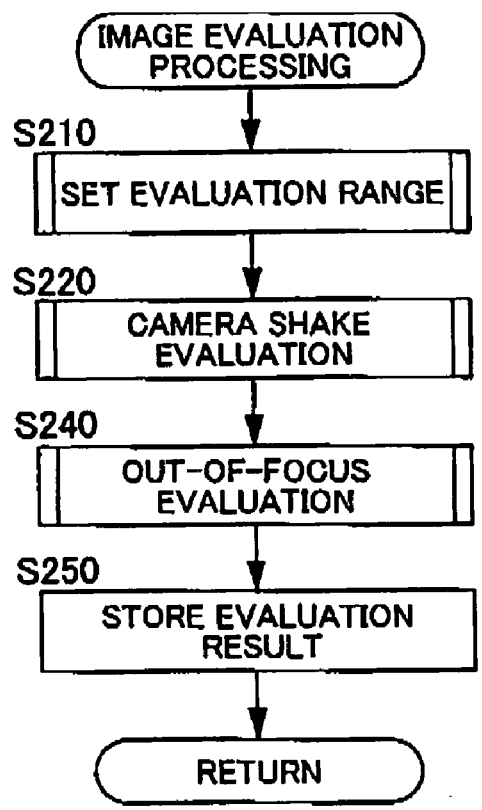
FIG. 4 is a flowchart for explaining image evaluation processing.

FIG. 4 is a flowchart for explaining the image evaluation processing. In this image evaluation processing, processing for setting of an evaluation range (S210), the camera shake evaluation (S220), the out-of-focus evaluation (S240), and storage of evaluation results (S250) is performed.

The respective kinds of processing will be hereinafter explained. Note that, a horizontal direction in an image is set as an X direction and a vertical direction in the image is set as a Y direction. Respective pixels P (see FIG. 6B, etc.) forming image information are represented as P(i, j) using a position i in the horizontal direction and a position j in the vertical direction in the image information.

Setting of an Evaluation Range (S210)

Figure 5:
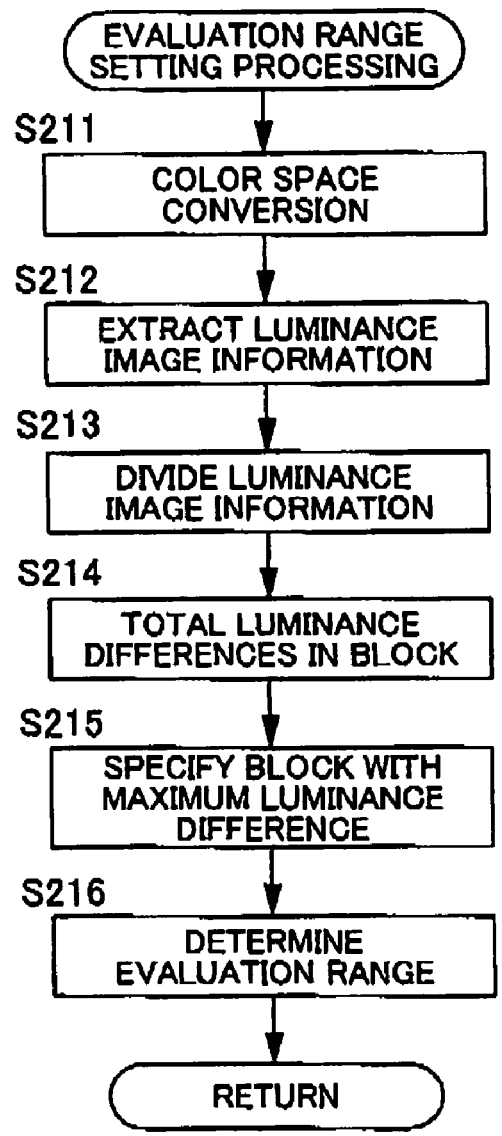
FIG. 5 is a flowchart for explaining setting for an evaluation range (S210)

FIG. 5 is a flowchart for explaining the setting of an evaluation range (S210). The respective kinds of processing are executed by the CPU 62 on the basis of a program stored in the memory 64 of the printer 1. Therefore, the program has codes for causing the CPU 62 to execute these kinds of processing.

Figure 6A:
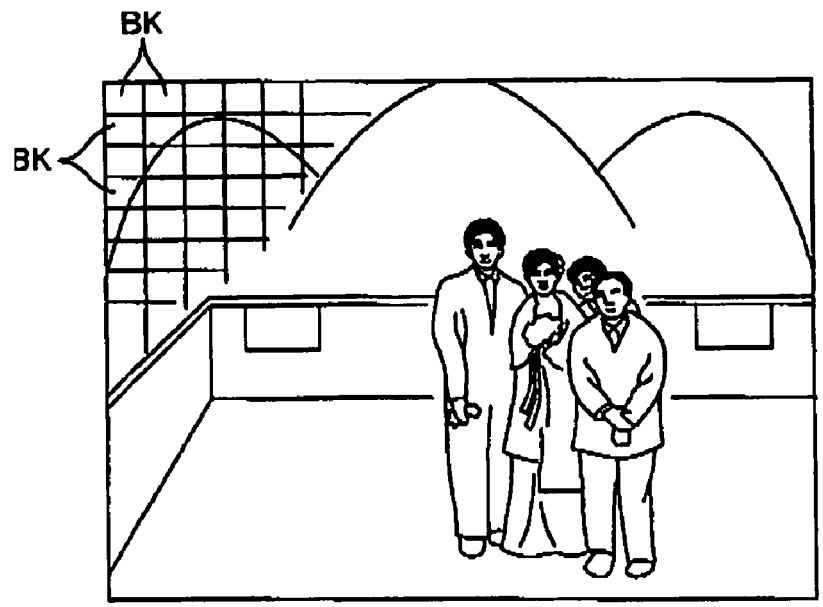
FIG. 6A is a conceptual diagram for explaining image information divided into 256 blocks BK.
Figure 6B:
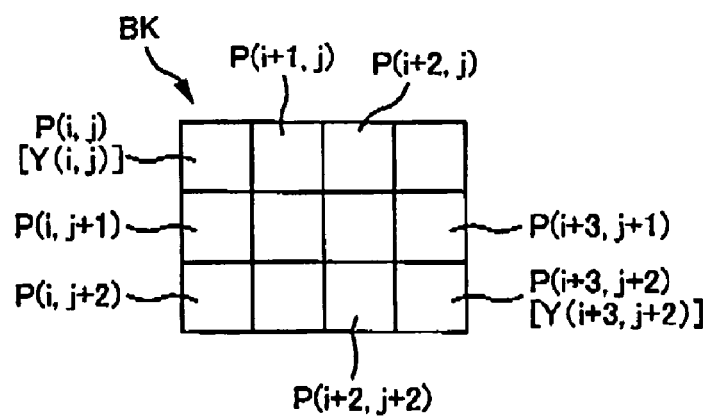
FIG. 6B is a conceptual diagram for explaining a luminance difference between adjacent pixels.
Figure 6C:
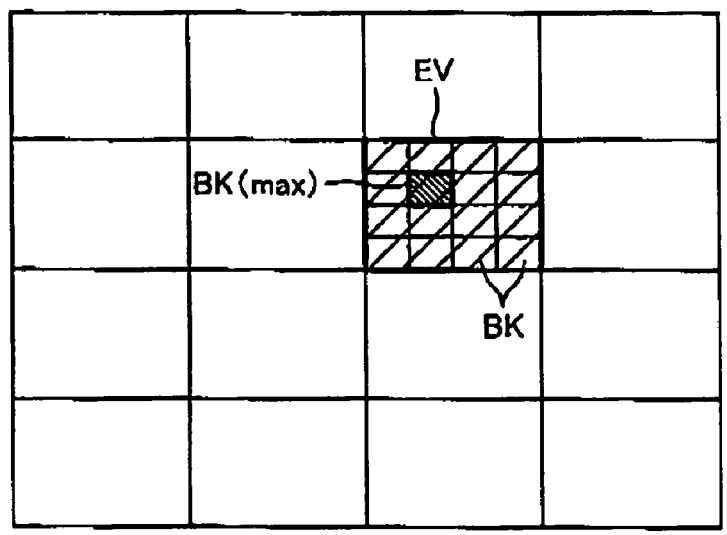
FIG. 6C is a conceptual diagram showing an evaluation range EV including a block BK having a largest number of edges.

FIG. 6A is a conceptual diagram for explaining image information divided into 256 blocks BK. FIG. 6B is a conceptual diagram for explaining a luminance difference between adjacent pixels. FIG. 6C is a conceptual diagram showing an evaluation range EV including a block BK having a largest number of edges.

In this setting of an evaluation range, the evaluation range EV is specified from the image information. The evaluation range EV is a range in which the camera shake evaluation (S220) and the out-of-focus evaluation (S230) are performed.

First, the CPU 62 converts a color space of evaluation image information (S211). For example, the CPU 62 converts evaluation image information represented by an RGB color space into image information of a YIQ color space (a color space of Y (luminance), I (orange-cyan), and Q (green-magenta)). Note that, when image information photographed by a digital camera is information of a JPEG format rather than bitmap information of the RGB color space, the color space of the evaluation image information may be converted into a YUV color space. In short, the color space of the evaluation image information only has to be converted into a color space including a component of luminance (Y).

Subsequently, the CPU 62 extracts luminance image information (S212). The image information of the YIQ color space generated by the conversion processing in S211 above has image information of a Y plane, image information of an I plane, and image information of a Q plane. Among these pieces of image information, the image information of the Y plane is extracted as luminance image information.

Subsequently, the CPU 62 divides the luminance image information (S213). In this embodiment, as shown in FIG. 6A, the luminance image information is divided by 16×16 into 256 blocks BK. For example, when the luminance image information is formed of 640×480 pixels, each of the blocks BS is formed of 40×30 pixels.

Subsequently, the CPU 62 calculates a luminance difference between each of the pixels of the luminance image information and a pixel adjacent to the pixel, and calculates a total of luminance differences for each of the blocks (S214). For convenience of explanation, it is assumed that, as shown in FIG. 6B, each of the blocks BK is configured of twelve pixels from a pixel P (i, j) at an upper left end to a pixel P (i+3, j+2) at a lower right end. In this case, the CPU 62 subtracts a luminance Y (i,j) of the pixel P (i, j) from a luminance Y (i+1, j) of the pixel P (i+1, j) to calculate a luminance difference in the horizontal direction of the pixel P (i, j). Similarly, the CPU 62 subtracts the luminance (i+1, j) of the pixel P (i+1, j) from a luminance Y (i+2, j) of a pixel P (i+2, j) to calculate a luminance difference in the horizontal direction of the pixel P (i+1, j). The CPU 62 applies such calculation to all the pixels in the block BK. Then, the CPU 62 totals absolute values of luminance differences to calculate a total of luminance differences in the horizontal direction in the block BK. Similarly, the CPU 62 also calculates a total of luminance differences in the vertical direction in each of the blocks BK. Then, the CPU 62 adds a total of luminance differences in the horizontal direction and a total of luminance differences in the vertical direction for each of the blocks to calculate a sum of luminance differences of each of the blocks.

Subsequently, the CPU 62 compares sums of luminance differences obtained in the respective blocks BK and specifies a block BK having a largest sum of luminance differences (S215). It is considered that, in pixels belonging to the block BK having the largest sum of luminance differences, a luminance difference is large between the pixels and adjacent pixels. In other words, it is considered that the block BK is a block BK having a largest number of edges. For example, in the image information in FIG. 6A, it is considered that a luminance difference is the largest in the part of a human face. Therefore, the block BK corresponding to the part of the human face is specified as a block BK (max) having a largest sum of luminance differences.

Subsequently, the CPU 62 sets an evaluation range EV on the basis of the specified block BK(max) (S216). This evaluation range EV is set such that the block BK (max) having the largest sum of luminance differences is arranged in the center thereof. A size of the evaluation range EV is set to a size obtained by reducing a size corresponding to the image information at a predetermined ratio. For example, when the evaluation range EV is set at a ratio of 0.25 with respect to the image information of 640×480 pixels (a size obtained by equally dividing a size corresponding to the image information into sixteen), as shown in FIG. 6C, the evaluation range EV is a range of 160×120 pixels (equivalent to 4×4 blocks).

The evaluation range set in this way has characteristics described below. Usually, in the case of image information photographed by a digital camera, a contour is clear in a part in focus. When the contour of the image is clear, a luminance difference between adjacent pixels in that part of the image information is large. Since the evaluation range is a range including the block BK having the largest luminance difference, the evaluation range EV set by the processing described above is considered to be a part in focus in the image information.

The CPU 62 applies the camera shake evaluation and the out-of-focus evaluation explained below to this evaluation range.

Camera Shake Evaluation (S220)

Camera shake is a state in which a photographer moves a camera when the photographer presses a shutter. When photographing is performed in this state, an image of a subject moves while the shutter is open. As a result, in an image photographed in the state of camera shake, since the subject is not photographed clearly, the image looks double in a predetermined direction (a camera shake direction) to be blurred. When shutter speed is low (time from opening of the shutter until closing of the shutter is long), an image is easily affected by camera shake. When the photographer performs photographing while looking at a liquid crystal monitor in a digital camera, a posture of the photographer tends to be unstable to easily cause camera shake.

Figure 7:
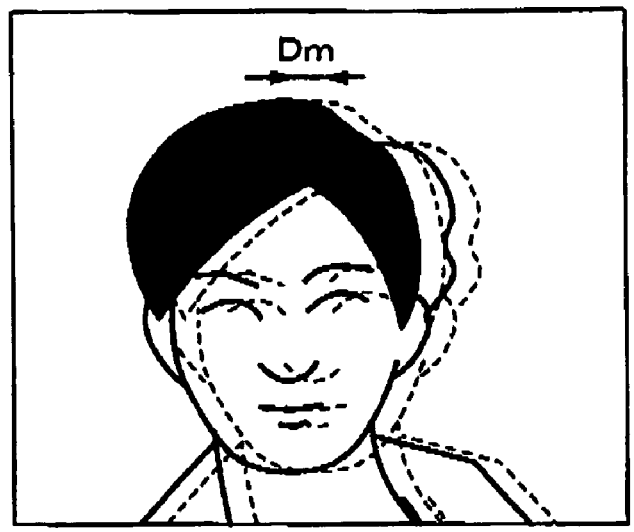
FIG. 7 is an explanatory diagram for conceptually explaining an influence on an image due to camera shake.

FIG. 7 is an explanatory diagram for conceptually explaining an influence on an image due to camera shake. A solid line in the figure indicates a position of the image at the time when the shutter is open. On the other hand, a dotted line in the figure indicates a position of the image at the time when the shutter is closed. When the subject is photographed in the state of camera shake, an image of the subject moves from the position of the solid line to the position of the dotted line. Here, the image indicated by the solid line moves in the horizontal direction by Dm. That is, when camera shake occurs, a certain point in the subject is photographed as a line with length Dm in the horizontal direction. In other words, when camera shake occurs, a certain point in the subject is photographed as a line with length Do in a camera shake direction θm. As a result, the photographed image is blurred between the image of the solid line and the image of the dotted line in the figure.

In image information photographed in the state of camera shake in the horizontal direction, a luminance difference between pixels adjacent to each other in the horizontal direction is small on the other hand, a luminance difference between pixels adjacent to each other in the vertical direction less easily becomes small compared with that in the horizontal direction. In other words, the image information photographed in the state of camera shake has a characteristic that a luminance difference between pixels adjacent to each other in a direction of the camera shake direction θm is small, but a luminance difference between pixels adjacent to each other in a direction perpendicular to the camera shake direction θm less easily becomes small.

In the camera shake evaluation (S220) in this embodiment, evaluation of a camera shake angle θm, which is a camera shake direction at the time of photographing, and evaluation of a degree of camera shake Dm are performed on the basis of such image information. The evaluation of the camera shake direction angle θm and the evaluation of the degree of camera shake Dm will be hereinafter separately explained.

Evaluation of the Camera Shake Direction Angle θm

Figure 8:
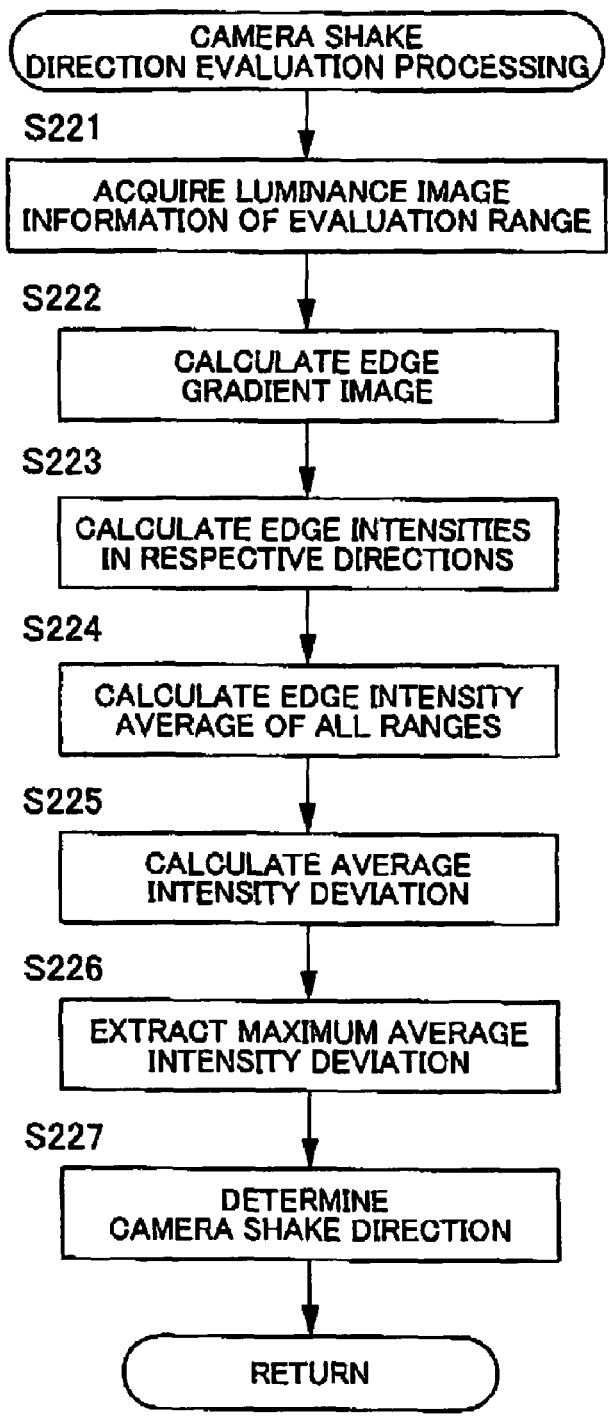
FIG. 8 is a flowchart for explaining evaluation of a camera shake direction angle $\theta m$.

FIG. 8 is a flowchart for explaining the evaluation of the camera shake direction angle θm. Respective kinds of processing are executed by the CPU 62 on the basis of a program stored in the memory 64 of the printer 1. Therefore, the program has codes for causing the CPU 62 to execute these kinds of processing.

First, the CPU 62 acquires luminance image information in the evaluation range EV set in S210 described above (S221). Here, the luminance image information in the evaluation range EV may be extracted from the luminance image information in the entire range in S212. Alternatively, it is also possible that image information in the evaluation range EV is extracted from the evaluation image information of the RGB color space and the extracted image information is subjected to color conversion to acquire luminance image information.

Subsequently, the CPU 62 applies a Sobel filter in the X direction to calculate an edge gradient image Gx indicating a gradient of a luminance in the X direction, and applies a Sobel filter in the Y direction to calculate an edge gradient image Gy indicating a gradient of a luminance in the Y direction (S222). In other words, the CPU 62 applies the Sobel filter in the X direction to extract an edge in the X direction of the luminance image information and applies the Sobel filter in the Y direction to extract an edge in the Y direction of the luminance image information. Pixels configuring the edge gradient image Gx are represented as Gx(i,j) and pixels configuring the edge gradient image Gy are represented as Gy (I,j). Gx (i,j) indicates an edge gradient in the X direction in a position (i,j) of the luminance image information, and Gy (i,j) indicates an edge gradient in the Y direction of the position (i,j) of the luminance image information.

Figure 10:
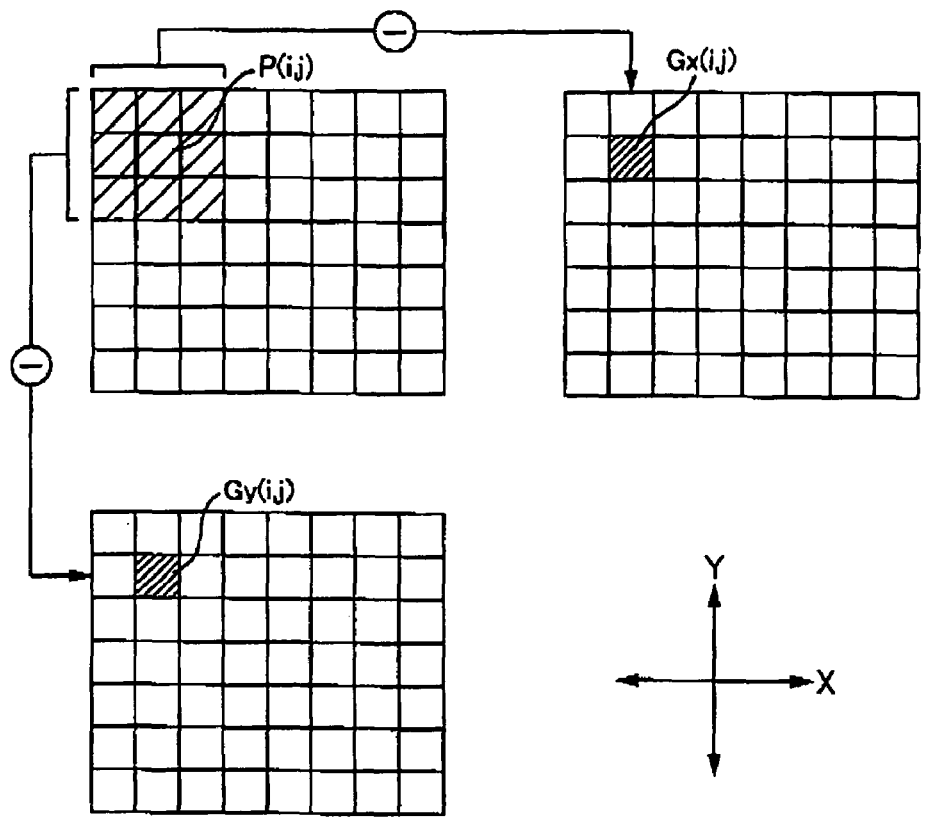
FIG. 10 is a diagram schematically illustrating application of a Sobel filter.

Here, the application of the Sobel filter will be explained. FIG. 9A is a diagram illustrating the Sobel filter in the X direction used for generation of an edge image. FIG. 9B is a diagram illustrating the Sobel filter in the Y direction used for generation of an edge image. FIG. 9C is a schematic diagram illustrating a range of 3×3 pixels around a certain pixel P (i,j) and a luminance Y of the pixel P in this range. FIG. 10 is a diagram schematically illustrating the application of the sobel filter.

The Sobel filter is a filter consisting of nine elements in 3×3. Applying the Sobel filter to the pixel P (i,j) shown in FIG. 9C means calculating a product of elements corresponding to the Sobel filter with respect to luminances Y(i−1,j−1) to Y(i+1,j+1) of 3×3 pixels present near the pixel P (i,j), and determining a sum of the nine products obtained. For example, when the Sobel filter in the X direction is applied to the pixel P (i,j), Gx(i,j) is calculated as follows.

$$Gx(i,j)=[Y(i+1,j-1)+2\times Y(i+1,j)+Y(i+1,j+1)]-[Y(i-1,j-1)+2\times Y(i-1,j)+Y(i-1,j+1)] \quad (1)$$

When the Sobel filter in the X direction and the Sobel filter in the Y direction are applied to the luminance image information Y(i,j), respectively, as indicated by hatching in FIG. 10, the edge gradient Gx (i,j) in the X direction and the edge gradient Gy(i,j) in the Y direction are determined on the basis of the 3×3 pixels around the pixel P (i,j).

When the Sobel filter in the X direction is applied to image information photographed in a state of camera shake in the horizontal direction (the X direction), since a gradient of a luminance in the X direction is small, the edge gradient Gx (i,j) in each of the pixels takes a small value. On the other hand, when the Sobel filter in the Y direction is applied, the edge gradient Gy(i,j) in each of the pixels tends to take a large value compared with Gx (i,j). In other words, as the camera shake direction θm is closer to 0 degree or 180 degrees, Gx (i,j) tends to take a larger value compared with Gy(i,j). Further, as the camera shake direction θm is closer to 90 degrees, Gy(i,j) tends to take a larger value compared with Gx(i,j).

Subsequently, the CPU 62 calculates edge intensities in the respective directions in the range of 0 to 180 degrees (π) (S223). In a certain pixel, since an edge gradient in a En direction of the pixel is calculated as cos θn*Gx(i,j)+sin θn*Gy(i,j), the CPU 62 calculates an edge intensity E (n) in the θn direction of the entire image as represented by the following Expression.

$$E(n) = \sum_j \sum_i [\text{ABS}\{(\cos\theta n - Gx(i,j) + \sin\theta n - Gy(i,j)\}] \quad (2)$$

In other words, the CPU 62 calculates edge gradients in the θn direction of the respective pixels and calculates a sum of absolute values of the edge gradients in the θn direction of all the pixels. The CPU 62 changes θ degree by degree to calculate edge intensities in the respective directions in the range of 0 to 180 degrees (calculate E(0) to E(179), respectively).

By the way, in the image information photographed in the camera shake state, since an edge in a direction same as the camera shake direction is blurred, an edge gradient in the camera shake direction is small. On the other hand, an edge in a direction perpendicular to the camera shake direction tends to remain. Therefore, an angle corresponding to a smallest edge intensity among the edge intensities in the respective directions is considered to be the cameras hake direction. A direction perpendicular to an angle corresponding to a largest edge intensity is considered to be the camera shake direction. However, when the camera shake direction is determined on the basis of a maximum value or a minimum value of edge intensities, it is likely that image information with a lot of noise is misevaluated. Thus, in this embodiment, a direction of camera shake is determined as described below.

Figure 11:
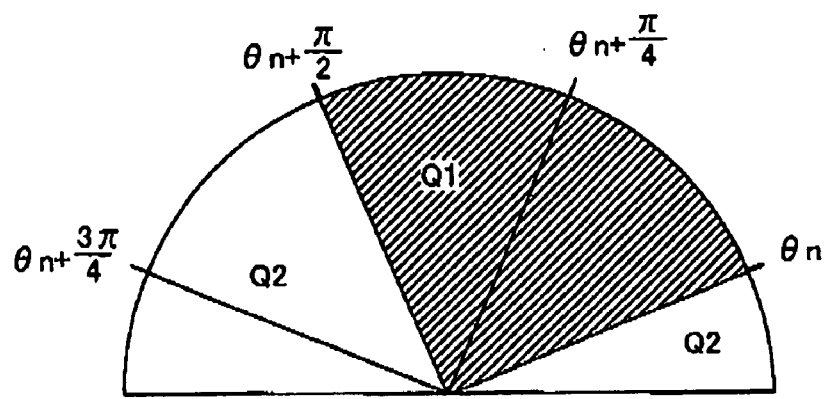
FIG. 11 is an explanatory diagram of quadrants Q1 and Q2.

First, the CPU 62 calculates an average of edge intensities in a range of all angles (hereinafter referred to as entire range edge intensity average) μ (S224). Then, the CPU 62 calculates an average μ1(n) of edge intensities in a range of a quadrant Q1 having a judgment angle θn as a starting point (hereinafter referred to as first edge intensity average) and an average μ2(n) of edge intensities in a range of a quadrant Q2 not belonging to this quadrant Q1. FIG. 11 is an explanatory diagram of the quadrants Q1 and Q2. A hatching part in the figure indicates the quadrant Q1 and a part not applied with hatching indicates the quadrant Q2. Here, the first edge intensity average μ1 indicates an edge intensity reflecting an edge gradient in a direction for equally dividing the quadrant Q1 into two (θn+π/4). Further, the second edge intensity average μ2 indicates an edge intensity reflecting an edge gradient in a direction for equally dividing the quadrant Q2 into two (θn+3π/4).

Subsequently, the CPU 62 calculates a sum of an absolute value of a deviation between the first edge intensity average μ(n) and the entire range edge intensity average μ and an absolute value of a deviation between the second edge intensity average μ(n), the entire range edge intensity average μ2(n) and the entire range edge intensity average μ (hereinafter referred to as average intensity deviation DEV(n)) calculated for the judgment angle θn (S225). The CPU 62 calculates average intensity deviations DEV in the respective directions in the range of 0 to 180 degrees. The average intensity deviation DEV(n) for the judgment angle θn is calculated as follows.

$$DEV(n)=ABS\{\mu 1(n)-\mu\}+ABS\{\mu 2(n)-\mu\} \quad (3)$$

The CPU 62 extracts a largest average intensity deviation (hereinafter referred to as maximum average intensity deviation) DEV(max) among the average intensity deviations in the respective directions (S226). In Q1 and Q2 corresponding to this largest average intensity deviation DEV(max), the first edge intensity average μ1 and the second edge intensity average μ2 are a maximum value and a minimum value. In Q1 and Q2 corresponding to this largest average intensity deviation DEV(max), a direction in which an edge intensity is the largest or a direction in which an edge intensity is the smallest equally divides the respective quadrants into two.

Then, the CPU 62 compares magnitudes of the first edge intensity average μ1(max) and the second edge intensity average μ2(max) corresponding to the maximum average intensity deviation DEV(max). When the first edge intensity average μ1 is smaller than the second edge intensity average μ2, the CPU 62 calculates an angle obtained by adding π/4 to a judgment angle θmax corresponding to the maximum average intensity deviation DEV (max) as the camera shake direction em. When the first edge intensity average μ1 is larger than the second edge intensity average μ2, the CPU 62 calculates an angle obtained by adding π/4 to the judgment angle θmax corresponding to the maximum average intensity deviation DEV(max) as the camera shake direction θm (S227).

Evaluation of the Camera Shake Degree Dm

Figure 12:
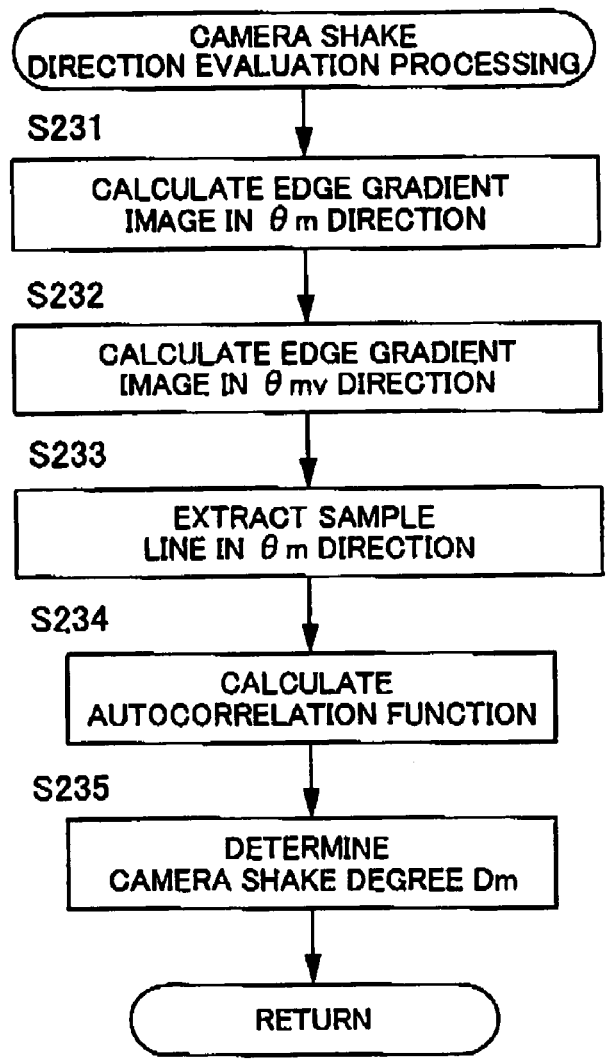
FIG. 12 is a flowchart for explaining evaluation of a degree of camera shake Dm.

FIG. 12 is a flowchart for explaining evaluation of the camera shake degree Dm. Respective kinds of processing are executed by the CPU 62 on the basis of a program stored in the memory 64 of the printer 1. Therefore, the program has codes for causing the CPU 62 to execute these kinds of processing.

First, the CPU 62 calculates an edge gradient image Rm in a camera shake direction (S221). The CPU 62 calculates an edge gradient image Rm(i,j) by applying a Sobel filter in the camera shake direction θm to the luminance image information Y(i,j).

Subsequently, the CPU 62 applies a Sobel filter in a direction θmv perpendicular to the camera shake direction θm to the edge gradient image Rm calculated to calculate an edge gradient image Rmv (S232). Note that, the edge gradient image Rmv in the image information blurred due to camera shake is an image in which a large number of bright spots look as if the bright spots extend in the camera shake direction. Length in the camera shake direction of the respective bright spots substantially coincides with the camera shake degree Dm. In other words, if it is possible to detect the length of the bright spots of the edge gradient image Rmv, it is possible to detect the camera shake degree Dm.

Figure 13A:
FIG. 13A is a conceptual diagram of a sample line.
Figure 13B:
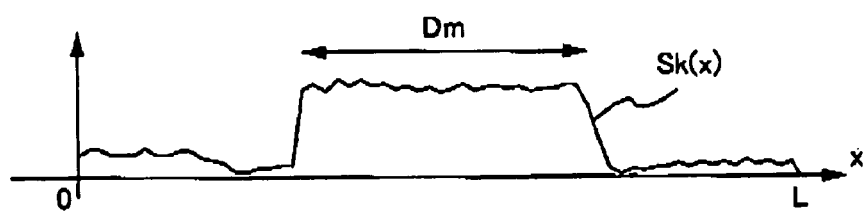
FIG. 13B is an explanatory diagram of a function Sk(x) defined by the sample line.

Thus, the CPU 62 extracts a predetermined number of sample lines in the camera shake direction Om from the obtained edge gradient image Rmv (S233). FIG. 13A is a conceptual diagram of the sample line. FIG. 13B is an explanatory diagram of a function Sk(x) defined by the sample line. In this embodiment, the sample line is formed of L pixels. The respective pixels forming the sample line are arranged in an x axis direction. The function Sk(x) indicates a size of a pixel corresponding to a position x in the edge gradient image Rmv. However, since only the L pixels configure the sample line, Sk(x)=0 in a range of x<0 and x>L−1. By the way, as described above, the edge gradient image Rmv is an image in which a large number of bright spots look as if the bright sports extend in the camera shake direction. Thus, the function Sk(x) is a function in FIG. 13B. That is, if the bright spots are included in the sample lines extracted, the function Sk(x) takes a large value in the range of Dam.

Subsequently, as represented by the following Expression, the CPU 62 calculates an autocorrelation function ACFk(τ) with respect to the respective sample lines on the basis of the function Sk(x) indicated by the respective sample lines (S234).

$$ACFk(\tau) = \sum_{x=0}^{L-1} Sk(x)Sk(x+\tau) \quad (4)$$

The autocorrelation function ACFk (τ) is a function for determining autocorrelation between Sk(x) and Sk(x+τ) obtained by shifting Sk(x) by τ. In other words, the autocorrelation function ACFk (τ) indicates a degree of coincidence of Sk(x) and Sk(x+τ). A higher value of the autocorrelation function ACFk(τ) indicates that Sk(x) and Sk(x+τ) coincide with each other more.

Figure 13C:
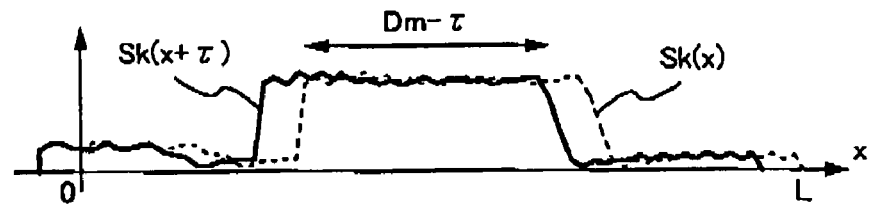
FIG. 13C is an explanatory diagram of a degree of coincidence of Sk(x) and Sk(x+$\tau$)

FIG. 13C is an explanatory diagram of a degree of coincidence of Sk(x) and Sk(x+τ). As explained already, the function Sk(x) is a function indicating a high value in the range of Dm. Therefore, Sk(x+τ) obtained by shifting Sk(x) by τ is also a function indicating a high value in the range of Dm. Thus, high values of Sk(x) and Sk(x+τ) coincide with each other in a range of Dm-τ. In other words, a range in which the high values coincide with each other increases as a value of τ is smaller. When the value of τ increases to Dm or more, the range disappears. As a result, in the range from τ=0 to τ=Dm, the autocorrelation function ACFk (τ) takes a higher value as τ is closer to 0 and takes a lower value as τ is closer to Dm. In a range of τ>Dm, correlation of Sk(x) and Sk(x+τ) disappears.

Figure 14:
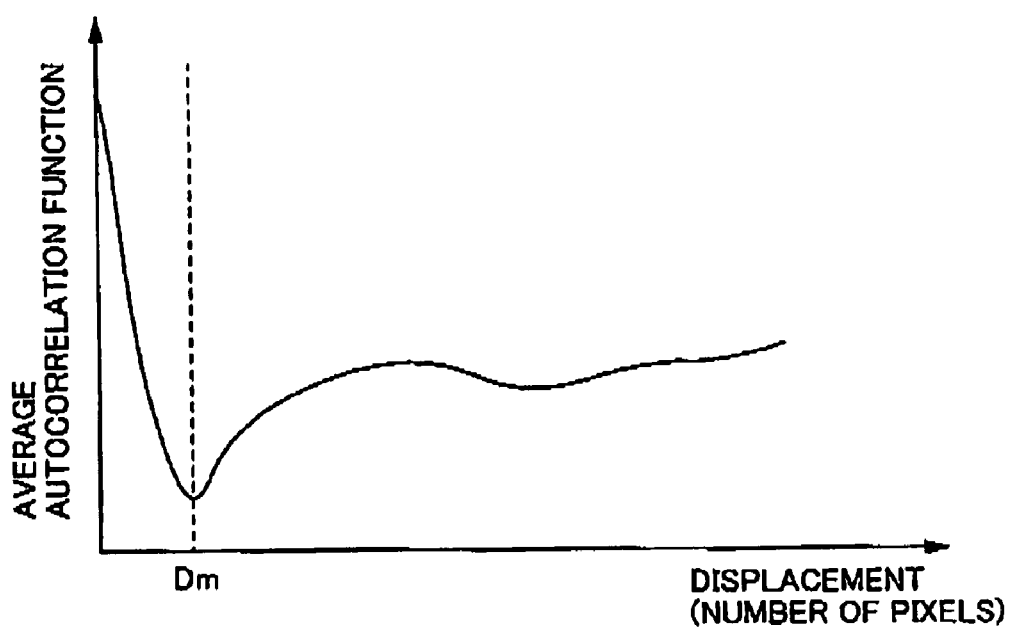
FIG. 14 is a graph showing a relation between displacement $\tau$, an average autocorrelation function ACFave, and a degree of camera shake Dm.

Thus, the CPU 62 calculates an average autocorrelation function ACFave as an average of the autocorrelation functions ACFk (τ) on all the sample lines and sets a displacement τ minimizing the average autocorrelation function ACFave as the camera shake degree Dm (S235). FIG. 14 is a graph showing a relation among the displacement τ, the average autocorrelation function ACFave, and the degree of camera shake Dm.

Out-of-Focus Evaluation

Out-of-focus blurring is an out-of-focus state. When photographing is performed in the state out of focus, an image of a subject is not focused on a film (in the case of a digital camera, on a CCD sensor). As a result, when the subject is photographed in the out of focus state, a photographed image is blurred.

As a cause of such a blurred image, there are camera shake and out-of-focus blurring. When photographing is performed in the camera shake state, information on a certain one point of the subject is recorded to be distributed in a plurality of pixels with the length Dm arranged in the camera shake direction. On the other hand, when photographing is performed in the out-of-focus state, information on a certain point of the subject is recorded to be distributed in a plurality of the pixels in concentric circles. In the out-of-focus evaluation in this embodiment, this characteristic of image information of out-of-focus blurring is used.

Figure 15:
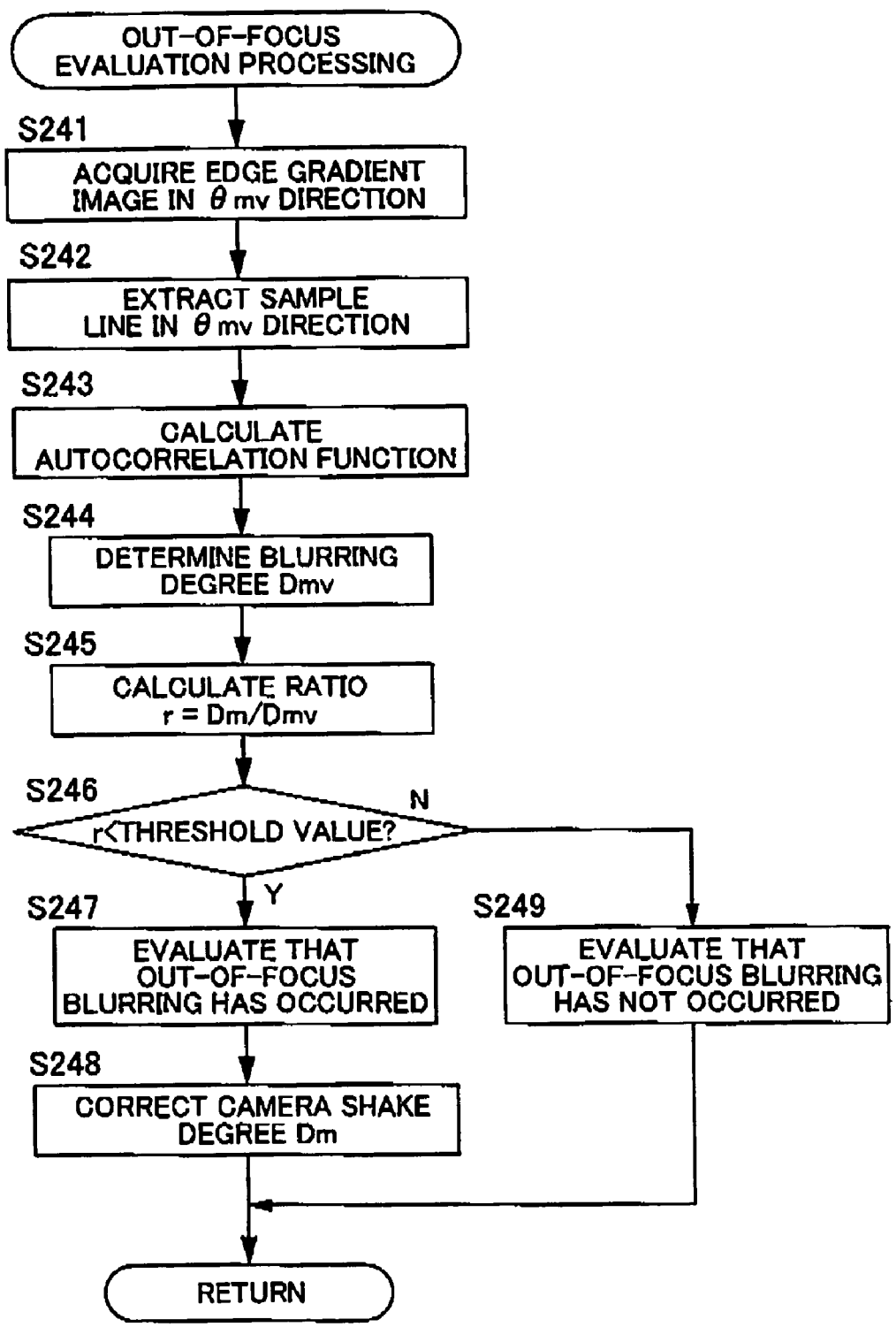
FIG. 15 is a flowchart for explaining out-of-focus evaluation.

FIG. 15 is a flowchart for explaining the out-of-focus evaluation. Respective kinds of processing are executed by the CPU 62 on the basis of a program stored in the memory 64 of the printer 1. Therefore, the program has codes for causing the CPU 62 to execute these kinds of processing.

First, the CPU 62 acquires the edge gradient image Rmv in the direction θmv perpendicular to the camera shake direction θm (S242). The edge gradient image Rmv is the same as that calculated in S232 described above. The edge gradient image Rmv calculated in S232 may be stored and read out in S242. Further, the edge gradient image Rmv may be calculated again with the same method as S232.

Subsequently, the CPU 62 extracts a predetermined number of sample lines in a direction perpendicular to the camera shake direction θm from the edge gradient image Rmv (S242). Compared with S233, a direction of the sample lines extracted is different by 90 degrees. In this case, it is possible to use information concerning the direction θmv perpendicular to the camera shake direction θm calculated in the camera shake evaluation described above.

Subsequently, the CPU 62 calculates the autocorrelation function $ACFk(\tau)$ in the same manner as in S234 (S243) described above, and determines the camera shake degree Dmv in the same manner as S235 (S244) described above. Since the processing here is the same as that in S234 and S235 described above, an explanation of the processing is omitted.

Note that, in image information not blurred due to out-of-focus blurring (including image information blurred because of only camera shake), information on a certain point of the subject is not distributed in the direction θmv perpendicular to the camera shake direction θm. Thus, the blurring degree Dmv in this direction θmv is small. On the other hand, in image information blurred due to out-of-focus blurring, information on a certain point of the subject is distributed in a concentric shape. Thus, the blurring degree Dmv in the direction θmv perpendicular to the camera shake direction θm is large.

Subsequently, the CPU 62 calculates a ratio r(=Dm/Dmv) of the camera shake degree Dm in the camera shake direction θm and the blurring degree Dmv in the direction θmv perpendicular to the camera shake direction θm (S246). Then, the CPU 62 judges whether the ratio r is smaller than a predetermined threshold value (different from the threshold value in S245) (S247). When the ratio r is larger than the threshold value (N in S247), it is evaluated that no out-of-focus blurring has occurred (S249). On the other hand, when the ratio r is smaller than the threshold value (Y in S247), it is evaluated that out-of-focus blurring has occurred (S247). In this case, the blurring degree Dmv in the direction θmv perpendicular to the camera shake direction θm is a value indicating a degree of out-of-focus blurring.

The subject may be photographed in the camera shake state in addition to the out-of-focus state. When the above described camera shake evaluation is applied to image information in this case, an influence due to out-of-focus blurring is included in the camera shake degree Dm. Therefore, when it is evaluated that out-of-focus blurring has occurred (Y in S246), the CPU 62 corrects the camera shake degree Dm calculated in the camera shake evaluation to remove the influence of out-of-focus blurring (S248). In this case, the CPU 62 corrects the camera shake degree Dm on the basis of the out-of-focus blurring degree Dm and the ratio r.

According to the out-of-focus evaluation in this embodiment, since it is possible to use the processing of the camera shake evaluation described above, for example, the following processing is reduced.

For example, in 3241 of the out-of-focus evaluation (acquisition of an edge gradient image in the θmv direction), it is possible to use the edge gradient image Rmv calculated in S232 of the camera shake evaluation (the edge gradient image Rmv is also information concerning the camera shake direction θm calculated in the camera shake evaluation and the direction θmv perpendicular to the camera shake direction θm described above). In this case, since the edge gradient image Rmv does not have to be calculated again, it is possible to reduce a load on the CPU 62 in S242 of the out-of-focus evaluation.

In S241 of the out-of-focus evaluation (acquisition of an edge gradient image in the θmv direction), the edge gradient image Rmv may be calculated again in the same method as S232 of the camera shake evaluation. However, although the processing for calculating the camera shake direction θm (S221 to S227) is performed before S232 is performed in the camera shake evaluation, it is unnecessary to perform calculation of the camera shake direction θm again in S242 of the out-of-focus evaluation. Thus, a load of calculation of the edge gradient image Rmv is reduced. Further, since it is possible to use the program, which is used in S232 of the camera shake evaluation, in S242 of the out-of-focus evaluation again, it is possible to simplify the program for the out-of-focus evaluation.

Further, since 5243 of the out-of-focus evaluation is the same processing as S234 of the camera shake evaluation, it is possible to simplify the program for the out-of-focus evaluation. That is, since the program for performing the processing in S234 of the camera shake evaluation returns $ACFk(\tau)$ with information on a sample line as an argument, if the sample line used as the argument is changed, it is possible to use this program in S243 of the out-of-focus evaluation.

Similarly, since S244 of the out-of-focus evaluation is the same processing as S235 of the camera shake evaluation, it is possible to simplify the program for the out-of-focus evaluation. That is, since the program for performing the processing in S244 of the camera shake evaluation returns the camera shake degree Dm with the autocorrelation functions $ACFk(\tau)$ of the respective sample lines as an argument, if a processing result in S234 is set as an argument, it is possible to obtain the camera shake degree Dmv in S244 of the out-of-focus evaluation from this program.

As described above, according to the out-of-focus evaluation in this embodiment, since it is possible to use the processing of the camera shake evaluation described above, the processing is reduced.

Storage of Evaluation Results (S250)

After the out-of-focus evaluation of certain evaluation image information, the CPU 62 performs storage of evaluation results (S250). The evaluation results include the camera shake direction θm and the camera shake degree Dm calculated in the camera shake evaluation (5220) and the out-of-focus blurring degree Dmv calculated in the out-of-focus evaluation (S240). These evaluation results are stored in the memory 64 in association with the evaluation image information.

Note that, after evaluation is performed for all the pieces of image information (Y in S130), in confirming image information to be backed up (S140), the CPU 62 displays pieces of image information to be backed up on the liquid crystal display section 3 in order one by one. In this case, evaluation results (the camera shake direction θm, the camera shake degree Dm, the out-of-focus blurring degree Dmv) corresponding to the image information displayed are displayed on the liquid crystal display section 3 on the basis of the evaluation results stored in the memory 64 in S250. The user looks at the evaluation results displayed on the liquid crystal display section 3 and decides, with the operation button 5, whether or not the image information should be backed up. The user may decide not to perform backup of the image information because, for example, the camera shake degree Dm is large. In this way, in confirming the image information to be backed up (S140), the evaluation results are displayed on the liquid crystal display section 3. Thus, it is possible to present a judgment material to the user. Consequently, useless image information is not written in the CD-R.

Other Embodiments

The embodiment is mainly described about the printer. However, it goes without saying that the embodiment includes disclosure of a computer system, a program, a storage medium having stored the program therein, and the like.

Further, the printer and the like as an embodiment are explained. However, the embodiment is intended to facilitate understanding of the invention and is not intended to interpret the invention in a limited manner. It goes without saying that the invention could be modified and improved without departing from the spirit thereof and the invention includes equivalents thereof. In particular, even embodiments described below are included in the invention.

Concerning Applied Products

Although the printer is explained in the embodiment described above, the present invention is not limited to this. For example, the evaluation processing for the image information above may be performed in a personal computer having image processing software installed therein.

It is possible to perform image correction processing with such image processing software. As correction processing for an image blurred due to out-of-focus blurring, an unsharp mask filter is known. If the image processing software applies the unsharp mask filter to image information, since an edge of an image is emphasized, it is possible to correct the image blurred due to out-of-focus blurring.

However, there are camera shake and out-of-focus blurring as a cause of blurring of an image. It is difficult for a beginner to determine, just by looking at a blurred image, whether the blurred image is caused by camera shake or out-of-focus blurring. Therefore, a user looking at an image blurred due to camera shake may judge that the blurred image is caused by out-of-focus blurring, and apply out-of-focus blurring correction to image information of the image. Conversely, a user looking at an image blurred due to out-of-focus blurring may judge the blurred image is caused by camera shake, and apply camera shake correction to image information of the image.

However, even if the unsharp mask filter is applied to image information blurred due to camera shake, the image is not appropriately corrected. Therefore, it is desirable that the image processing software automatically selects out-of-focus blurring correction or camera shake correction on the basis of an evaluation result of the image information.

When out-of-focus blurring correction and camera shake correction are performed, it is desirable to display correction results on a display to a user. By the way, when out-of-focus blurring correction and camera shake correction are performed, an edge of an image is emphasized and a contour of the image is made clear. After correction is performed to make the contour of the image clear in this way, if enlargement/reduction processing is applied to the image information after correction in displaying the image on the display, it is likely that even the contour made clear is magnified to make the displayed image unnatural. As a result, although the image correction is appropriately applied to the original image information, it is likely that the user judges that appropriate image correction is not performed. Therefore, when out-of-focus blurring correction and camera shake correction are performed, in displaying the image information after correction, it is desirable to display the image on the display at no magnification without performing the enlargement/reduction processing. Thus, the user can correctly recognize the image information after correction.

Conclusion (1) It is difficult for a beginner to determine, just by looking at a blurred image, whether the blurred image is caused by camera shake or out-of-focus blurring. Thus, it is desirable to automatically apply the camera shake evaluation and the out-of-focus evaluation to image information. However, when processing of the camera shake evaluation and processing of the out-of-focus evaluation are completely separately performed, the processing takes time.

Thus, in the image evaluation processing, first, after acquiring evaluation image information to be evaluated (S110), the CPU 62 performs the camera shake evaluation of the image information by determining the camera shake direction $\theta m$ on the basis of the evaluation image information to (S220 and S221 to S227). Then, the CPU 62 performs out-of-focus evaluation of the evaluation image information by using information concerning the camera shake direction $\theta m$ determined in the camera shake evaluation (S220).

Consequently, since the information concerning the camera shake direction $\theta m$, which is a result of the camera shake evaluation, is used for the out-of-focus evaluation, it is possible to reduce processing time of the out-of-focus evaluation.

(2) The result of the camera shake evaluation used in the out-of-focus evaluation includes information on the camera shake direction $\theta m$. In the out-of-focus evaluation, the CPU 62 calculates the direction $\theta mv$ perpendicular to the camera shake direction $\theta m$ and evaluates the degree of blurring Dmv in the direction $\theta mv$ (S244).

Reasons for calculating the degree of blurring Dmv in the direction $\theta mv$ perpendicular to the camera shake direction $\theta m$ are as described below. When an image is blurred because of an influence of camera shake, a luminance difference between pixels adjacent to each other in the camera shake direction $\theta m$ is small (an edge is unclear). However, a luminance difference between pixels adjacent to each other in the direction $\theta mv$ perpendicular to the camera shake direction $\theta m$ less easily becomes small (an edge is less easily crushed). Therefore, in the image affected by camera shake, the degree of blurring Dmv in the direction $\theta mv$ perpendicular to the camera shake direction $\theta m$ is small compared with a degree of blurring in the camera shake direction $\theta m$. On the other hand, when an image is blurred because of an influence of out-of-focus blurring, information on a certain point of a subject is recorded to be distributed in plural pixels in concentric circles (in other words, in the case of out-of-focus blurring, information on a certain pixel includes information in concentric circles in the subject). Therefore, in the image blurred because of out-of-focus blurring, since luminance differences among pixels adjacent to one another in all the directions are small, a luminance difference between pixels adjacent to each other in the direction $\theta mv$ perpendicular to the camera shake direction $\theta m$ is small (that is, the degree of blurring $\theta m$ in this direction $\theta mv$ is large). Therefore, it is possible to distinguish camera shake and out-of-focus blurring if the blurring degree Dm in the camera shake direction $\theta m$ and the blurring degree Dmv in the direction $\theta mv$ perpendicular to the camera shake direction $\theta m$ are compared.

(3) The result of the camera shake evaluation used in the out-of-focus evaluation includes the edge gradient image Rmv in the direction $\theta m$ perpendicular to the camera shake direction $\theta m$. Usually, when the edge gradient image Rmv is acquired from evaluation image information, it is necessary to calculate the camera shake direction $\theta m$ and apply a Sobel filter in the camera shake direction $\theta m$ or a Sobel filter in the direction $\theta mv$ perpendicular to the camera shake direction $\theta m$ to the evaluation image information to calculate the edge gradient image Rmv. However, in the embodiment described above, since the camera shake evaluation is performed before the out-of-focus evaluation, it is possible to use the result of the camera shake evaluation to acquire the edge gradient image Rmv. Thus, processing time for the out-of-focus evaluation is reduced.

(4) In the camera shake evaluation in the embodiment, a sample line in the camera shake direction $\theta m$ is extracted from the edge gradient image Rmv. In the out-of-focus evaluation in the embodiment, a sample line in the direction $\theta mv$ perpendicular to the camera shake direction $\theta m$ is extracted from the edge gradient image Rmv. It is possible to evaluate a degree of blurring in a direction of the sample line if a change in a direction of an edge of the sample line is evaluated.

(5) As shown in FIG. 7, an image photographed in a camera shake state is blurred in the camera shake direction θm. Therefore, original image information and image information obtained by displacing the image information in the camera shake direction θm by Dm have high autocorrelation. Therefore, in performing the camera shake evaluation, the CPU 62 can evaluate the degree of camera shake Dm on the basis of an autocorrelation function of a sample line in the camera shake direction θm.

On the other hand, in an image photographed in an out-of-focus blurring state, information on a certain one point of a subject is recorded to be distributed in plural pixels in concentric circles. Therefore, a sample line and a sample line obtained by displacing the sample line by a diameter of the concentric circles have high autocorrelation. Therefore, in performing the out-of-focus evaluation, the CPU 62 can evaluate the degree of out-of-focus blurring Dmv on the basis of an autocorrelation function of a sample line in the direction θmv perpendicular to the camera shake direction θm.

(6) It is possible to perform some part of the processing for the out-of-focus evaluation in common with the processing for the camera shake evaluation. For example, The processing in S242 of the out-of-focus evaluation (extraction of a sample line in the direction θmv) is substantially the same as the processing in S233 of the out-of-focus evaluation (extraction of a sample line in the direction θm). Therefore, if the edge gradient image Rmv and a direction in which a sample line is extracted are set as arguments and a program is formed to output the sample line, it is possible to perform both the kinds of processing using the same program (or the same hardware circuit).

(7) As explained already, when an image is blurred because of an influence of out-of-focus blurring, information on a certain one point of a subject is recorded to be distributed in plural pixels in concentric circles. Therefore, it is possible to evaluate a diameter of the concentric circles no matter in which direction a degree of blurring is evaluated. However, since it is likely that the image is affected by both camera shake and out-of-focus blurring, the out-of-focus evaluation is performed on the basis of a degree of blurring in a direction in which the image is not affected by camera shake (a direction perpendicular to the camera shake direction θm).

(8) In the embodiment, the CPU 62 evaluates a degree of out-of-focus blurring on the basis of the ratio (=Dm/Dmv) of the camera shake degree Dm in the camera shake direction θm and the blurring degree Dmv in the direction θmv perpendicular to the camera shake direction θm. For example, if the ratio r is larger than a threshold value, it is evaluated that no out-of-focus blurring has occurred and, if the ratio r is smaller than the threshold value, it is evaluated that out-of-focus blurring has occurred. This makes it possible to determine, when an image is blurred, whether the blurred image is caused by camera shake or out-of-focus blurring.

(9) In the embodiment, the CPU 62 divides evaluation image information by 16×16 into 256 blocks (S213). The CPU 62 selects a specific area from the areas divided and applies the camera shake evaluation to the specific area selected. If the camera shake evaluation is applied to all the pieces of image information, a calculation amount of the CPU 62 increases and processing takes time on the other hand, in the embodiment, since the camera shake evaluation is applied to a narrow area, it is possible to reduce processing time.

(10) In the embodiment, for each of the divided blocks, a total of luminance differences in the block is calculated. Consequently, in a block in focus most, since a contour of the image is clear, a luminance difference between pixels adjacent to each other is large. Consequently, if a block with a largest luminance difference is extracted, it is possible to extract a part in focus.

In particular, when a subject is photographed with the background other than the subject blurred in order to emphasize the subject, if image evaluation is applied to an entire image, it is likely to be evaluated that camera shake or out-of-focus blurring has occurred regardless of the fact that the subject is in focus. On the other hand, in the image evaluation, since evaluation is performed in a part in focus most, accuracy of the image evaluation is improved.

(11) There are camera shake and out-of-focus blurring as a cause of blurring of an image. It is difficult for a beginner to determine, just by looking at a blurred image, whether the blurred image is caused by camera shake or out-of-focus blurring. Therefore, it is difficult for the beginner to judge whether the camera shake correction or the out-of-focus blurring correction should be applied to the blurred image. Thus, in the embodiment of the image processing software, the camera shake correction is applied to image information on the basis of a result of the camera shake evaluation and the out-of-focus blurring correction is applied to the image information on the basis of a result of the out-of-focus evaluation. This makes it possible to automatically apply the camera shake correction or the out-of-focus blurring correction to evaluation image information. Thus, even the beginner can perform appropriate image correction.

(12) When image correction is performed, a contour of an image is made clear. However, after such correction is performed, in displaying the image on a display, if enlargement/reduction processing is applied to image information after correction, it is likely that even the contour made clear is magnified and the image displayed is made unnatural. As a result, regardless of the fact that the image correction is appropriately applied to the original image information, it is likely that a user judges that appropriate image correction is not performed. Thus, in the embodiment of the image software, in displaying image information after correction on the display, the image information is displayed at no magnification.

(13) According to the image evaluating method including all the elements described above, all the effects are obtained. Thus, the image evaluating method is desirable. However, it goes without saying that it is unnecessary to include all the elements.

(14) The program for controlling the printer 1 causes the CPU 62 (an example of an arithmetic processing unit) and the memory 64 to acquire image information, performs the camera shake evaluation of the image information by determining the camera shake direction θm on the basis of the image information, and performs the out-of-focus evaluation of the image information by using information concerning the camera shake direction em determined in the camera shake evaluation.

The image processing software causes a CPU (an example of an arithmetic processing unit) and a RAM (an example of a memory) of a personal computer having this image processing software installed therein to acquire image information, to perform the camera shake evaluation of the image information by determining the camera shake direction θm on the basis of the image information, and to perform the out-of-focus evaluation of the image information by using information concerning the camera shake direction θm determined in the camera shake evaluation.

This makes it possible to reduce processing time for the out-of-focus evaluation.

(15) The printer 1 (an example of an image information evaluating apparatus) acquires image information, performs the camera shake evaluation of the image information by determining the camera shake direction θm on the basis of the image information, and performs the out-of-focus evaluation of the image information by using information concerning the camera shake direction Om determined in the camera shake evaluation.

A personal computer (an example of an image information evaluating apparatus) having the image processing software installed therein also acquires image information, performs the camera shake evaluation of the image information by determining the camera shake direction θm on the basis of the image information, and performs the out-of-focus evaluation of the image information by using information concerning the camera shake direction θm determined in the camera shake evaluation.

However, the image information evaluating apparatus is not limited to this. For example, the image information evaluating apparatus may be a digital camera. In this case, it is desirable that, immediately after an image is photographed, evaluation is applied to the image photographed and an evaluation result is displayed for a photographer. Consequently, the photographer can photograph an image while watching out for camera shake and out-of-focus blurring or can erase photographed image information.

What is claimed is:

1. An evaluating method image information, comprising:
   acquiring image information;
   calculating, by a computer, a camera shake degree in a camera shake direction based on the image information;
   calculating, by the computer, a camera shake degree in a direction perpendicular to the camera shake direction based on the image information; and
   evaluating, by the computer, whether the image information is out-of-focus or not based on the camera shake degree in the camera shake direction and the camera shake degree in the direction perpendicular to the camera shake direction.

2. An evaluating method according to claim 1, wherein
   the calculating the camera shake degree in the camera shake direction comprises extracting a sample line in the camera shake direction and calculating the camera shake degree in the camera shake direction based on an autocorrelation function of the extracted sample line; and
   the calculating the camera shake degree in the direction perpendicular to the camera shake direction comprises extracting a second sample line in the direction perpendicular to the camera shake direction and calculating the camera shake degree in the direction perpendicular to the camera shake direction based on an autocorrelation function of the second extracted sample line.

3. An evaluating method according to claim 1, wherein:
   the camera shake degree in the camera shake direction is calculated based on a function by setting the camera shake direction as an argument, and
   the camera shake degree in the direction perpendicular to the camera shake direction is calculated based on said function by setting the direction perpendicular to the camera shake direction as an argument.

4. An evaluating method according to claim 1, wherein:
   the image information is divided into a plurality of areas,
   a luminance difference within each of the divided areas is calculated,
   an area in which the luminance difference is largest is selected, and
   the camera shake degree in the camera shake direction and the camera shake degree in the direction perpendicular to the camera shake direction are calculated in the selected area.

5. An evaluating method according to claim 1, wherein
   an out-of-focus correction is performed on the image information in case the image information is evaluated as an out-of-focus image.

6. An evaluating method according to claim 5, wherein
   image information subjected to the out-of-focus correction is displayed at no magnification.

7. An image information evaluating apparatus, comprising:
   a memory; and
   an arithmetic processing unit that;
   acquires image information,
   calculates a camera shake degree in a camera shake direction based on the image information,
   calculates a camera shake degree in a direction perpendicular to the camera shake direction based on the image information, and
   evaluates whether the image information is out-of-focus or not based on the camera shake degree in the camera shake direction and the camera shake degree in the direction perpendicular to the camera shake direction.

8. An image information evaluating apparatus according to claim 7, wherein the image information evaluating apparatus is a printing apparatus.

9. An image information evaluating apparatus according to claim 7, wherein the image information evaluating apparatus is a photographing apparatus.

* * * * *